(12) United States Patent
Shimotani et al.

(10) Patent No.: US 9,043,139 B2
(45) Date of Patent: May 26, 2015

(54) MAP DISPLAY DEVICE

(75) Inventors: Mitsuo Shimotani, Tokyo (JP); Makoto Mikuriya, Tokyo (JP); Takeo Sakairi, Tokyo (JP); Fujio Hayakawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 13/386,046

(22) PCT Filed: Feb. 12, 2010

(86) PCT No.: PCT/JP2010/000874
§ 371 (c)(1),
(2), (4) Date: Jan. 20, 2012

(87) PCT Pub. No.: WO2011/099076
PCT Pub. Date: Aug. 18, 2011

(65) Prior Publication Data
US 2012/0123677 A1 May 17, 2012

(51) Int. Cl.
G01C 21/26 (2006.01)
G01C 21/36 (2006.01)
G08G 1/0969 (2006.01)
G09B 29/10 (2006.01)

(52) U.S. Cl.
CPC ......... *G01C 21/3667* (2013.01); *G08G 1/0969* (2013.01); *G09B 29/106* (2013.01)

(58) Field of Classification Search
CPC . G01C 21/26; G01C 21/3626; G01C 21/3667
USPC .................................................. 701/36, 454
See application file for complete search history.

(56) References Cited

U.S. PATENT DOCUMENTS

| | | | |
|---|---|---|---|
| 5,911,774 A | 6/1999 | Itoh | |
| 6,035,400 A | 3/2000 | Yasuoka | |
| 6,169,956 B1 * | 1/2001 | Morimoto et al. | 701/428 |
| 2003/0045979 A1 * | 3/2003 | Ogasawara | 701/36 |
| 2004/0190715 A1 | 9/2004 | Nimura et al. | |
| 2008/0189032 A1 * | 8/2008 | Beadman | 701/208 |
| 2009/0322904 A1 | 12/2009 | Takahashi | |
| 2011/0024507 A1 * | 2/2011 | Tanaka et al. | 235/487 |

FOREIGN PATENT DOCUMENTS

| | | | |
|---|---|---|---|
| JP | 10-153437 A | | 6/1998 |
| JP | 2003-78425 A | | 3/2003 |
| JP | 2004-302930 A | | 10/2004 |
| JP | 2004302930 A | * | 10/2004 |
| JP | 2005-204000 A | | 7/2005 |
| JP | 2009-53222 A | | 3/2009 |
| JP | 2009053222 A | * | 3/2009 |

* cited by examiner

*Primary Examiner* — Redhwan k Mawari
*Assistant Examiner* — Rodney P King
(74) *Attorney, Agent, or Firm* — Birch, Stewart, Kolasch & Birch, LLP (57) ABSTRACT

A map display device includes: current location calculating unit for calculating a current location; specific region dedicated database for storing map data permitted only inside a specific region; specific region permitted database for storing data for displaying the inside of the specific region outside the specific region; outside-specific-region database for storing map data of the outside of the specific region available both inside and outside the specific region; controller for generating display data for displaying a map of the outside of the specific region using map data from the outside-specific-region database, and generating display data for displaying an image of a permitted map attribute to the inside of the specific region using the data from the permitted database, when the current location is outside the specific region; and display unit for displaying an image of the map or the permitted map attribute based on the display data.

18 Claims, 11 Drawing Sheets

|  |  | ○: Permitted, ×: Not Permitted | |
|---|---|---|---|
| Map Attribute Category | Detail | Map Outside Specific Region | Map Inside Specific Region |
| Display | Ordinary Road | ○ | × |
|  | Arterial Road | ○ | ○ |
|  | Name (Detail) | ○ | × |
|  | Rough Shape, Polygon Display | ○ | × |
|  | Satellite Photo | ○ | ○ |
|  | Major City Name | ○ | ○ |
|  | Route Display | ○ | × |
|  | Driving History | ○ | × |
| Search | Detailed Road Network | ○ | × |
|  | Arterial Road Network | ○ | ○ |
| POI | Detailed POI | ○ | × |
|  | Major POI | ○ | ○ |

(a) Display When Vehicle Position is Inside Specific Region (b) Display When Vehicle Position is Outside Specific Region    Satellite Photo

FIG.7

(a) Display When Vehicle Position is Inside Specific Region (b) Display When Vehicle Position is Outside Specific Region

| Map Attribute Category | Detail | ○: Permitted, ×: Not Permitted | | |
| --- | --- | --- | --- | --- |
| | | Map Outside Specific Region (DB Available) | Map Outside Specific Region (DB Unavailable) | Map Inside Specific Region |
| Display | Ordinary Road | ○ | — | × |
| | Arterial Road | ○ | — | ○ |
| | Name (Detail) | ○ | — | × |
| | Rough Shape, Polygon Display | ○ | — | × |
| | Satellite Photo | ○ | ○ | ○ |
| | Major City Name | ○ | — | ○ |
| | Route Display | ○ | — | × |
| | Driving History | ○ | — | × |
| Search | Detailed Road Network | ○ | — | × |
| | Arterial Road Network | ○ | — | ○ |
| POI | Detailed POI | ○ | — | × |
| | Major POI | ○ | — | ○ |

FIG.11

(a) When Vehicle Position is Inside Specific Region

Outside Specific Region (White)
Database Available

Specific Region (Gray)

Vehicle Position   Arterial Road

Outside Specific Region
Database Unavailable Except Satellite Photo
Satellite Photo Display (b) When Vehicle Position is Outside Specific Region Outside Specific Region (White)
Database Available Specific Region
(Satellite Photo With Different Hue)

Vehicle Position   Arterial Road

Outside Specific Region
Database Unavailable Except Satellite Photo
Satellite Photo Display

MAP DISPLAY DEVICE

TECHNICAL FIELD

The present invention relates to a map display device mounted on a vehicle to display the map of the surroundings of the vehicle of the vehicle, and more particularly to a technique of controlling whether the map is displayed or not depending on the region where the vehicle exists.

BACKGROUND ART

In using a map display device that reads out map data from a storage medium and performs a map display, there exists a region such that the map data stored in the map display device needs to be handled with care. For example, in some countries, it is prohibited to take out the map data stored in the map display device abroad; thus, when a vehicle having the map display device mounted thereon moves out of the country, it is necessary to prohibit a map display using the domestic map data.

To deal with such a region covered in a map that needs to be handled with care, Patent Document 1 discloses a map display device that can prevent itself from being taken out of a specific region in a state where the map data of the specific region can be read out. The map display device determines whether or not the current location is near the boundary of the specific region; if the location is judged near the boundary, the device displays a confirmation screen asking the user whether the readout of the map data stored in a memory device is disabled or not, and in response to a user's operation that permits disabling the readout of the map data, performs a process to disable the readout of the map data from the memory device. In this manner, the map display of the specific region can be locked near the border to prevent the user from unknowingly taking out the map data abroad in a state where the map is displayable.

PRIOR ART DOCUMENTS

Patent Documents

Patent Document 1: Japanese Patent Application Laid-open No. 2009-53222

However, as exemplified in the map display device disclosed in the aforementioned Patent Document 1, there is a problem such that when the vehicle travels outside the specific region with the map display of the specific region being locked, the inside of the specific region is displayed as a blank, which is very bad in user friendliness.

The present invention is made to solve the aforementioned problem, and an object of the invention is to provide a map display device that can display a specific region covered in a map that needs to be handled with care without any feeling of incongruity.

SUMMARY OF THE INVENTION

A map display device of the present invention includes: a current location calculating unit for calculating a current location; a specific region dedicated database for storing map data that is permitted only in the inside of a specific region; a specific region permitted database for storing data in which displaying the inside of the specific region is peimitted in the outside of the specific region; an outside-specific-region database for storing map data of the outside of the specific region available in both inside and outside of the specific region; a controller for generating display data for displaying a map in the outside of the specific region by using the map data obtained from the outside-specific-region database, and also generating display data for displaying an image of a permitted map attribute in the inside of the specific region by using the data obtained from the specific region permitted database, when the current location calculated by the current location calculating unit is outside the specific region, and further generating display data for displaying a map in the outside of the specific region by using the map data obtained from the outside-specific-region database, and also generating display data for displaying a map in the inside of the specific region by using the map data obtained from the specific region dedicated database, when the current location calculated by the current location calculating unit is inside the specific region; and a display unit for displaying an image of the map or the permitted map attribute based on the display data generated in the controller.

According to the map display device of the invention, it is configured such that when the map of which the display is permitted only inside a specific region is displayed inside the specific region, it is displayed as is, whereas when the map of the inside of the specific region is displayed outside the specific region, the image of the permitted map attribute is displayed, so that the specific region covered in a map that needs to be handled with care can be displayed without a feeling of incongruity.

BEST MODE FOR CARRYING OUT THE INVENTION

Embodiments of the present invention will be hereinafter described in detail with reference to the accompanied drawings.

Embodiment 1

Figure 1:
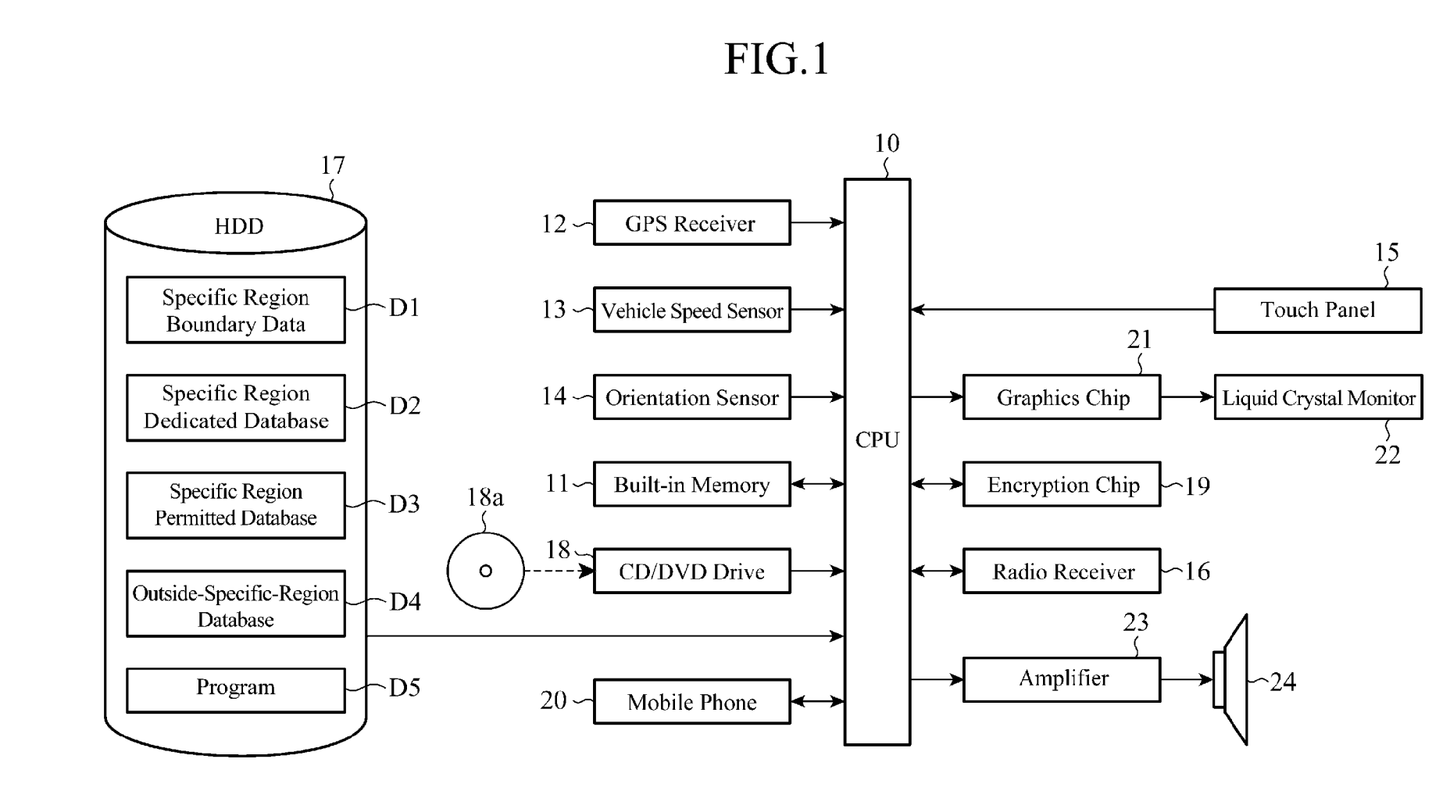
FIG. 1 is a block diagram showing a configuration of a map display device of Embodiment 1 in the present invention.

FIG. 1 is a block diagram showing a configuration of a map display device of Embodiment 1 in the invention. The map display device includes a CPU (Central Processing Unit) 10, a built-in memory 11, a GPS (Global Positioning System) receiver 12, a vehicle speed sensor 13, an orientation (bearing) sensor 14, a touch panel 15, a radio receiver 16, an HDD (Hard Disk Drive) 17, a CD (Compact Disc)/DVD (Digital Versatile Disk) drive 18, an encryption chip 19, a mobile phone 20, a graphics chip 21, a liquid crystal monitor 22, an amplifier 23, and a speaker 24.

The CPU 10 corresponds to the controller of the invention, and controls the whole map display device by executing predetermined processes while sending and receiving data to and from at least one of the built-in memory 11, GPS receiver 12, vehicle speed sensor 13, orientation sensor 14, touch panel 15, radio receiver 16, HDD 17, CD/DVD drive 18, encryption chip 19, mobile phone 20, graphics chip 21, or amplifier 23. The details of the processes executed by the CPU 10 will be described later.

The built-in memory 11 is constituted by, for example, a RAM (Random Access Memory). A program D5 (described later in detail) read in from the HDD 17 is deployed in the built-in memory 11. The CPU 10 operates in accordance with the program D5 deployed in the built-in memory 11. The built-in memory 11 is also used for temporarily storing the data under processing in the CPU 10.

The GPS receiver 12 detects the current location of a vehicle on which the map display device is mounted based on a GPS signal obtained by receiving radio waves transmitted from a GPS satellite with an antenna (not shown). The data of the current location indicating the current location of the vehicle detected by the GPS receiver 12 is sent to the CPU 10.

The vehicle speed sensor 13 detects a moving speed of the vehicle based on the vehicle speed pulse sent from the vehicle on which the map display device is mounted. The speed data indicating the moving speed of the vehicle detected by the vehicle speed sensor 13 is sent to the CPU 10. The orientation sensor 14 detects the traveling orientation of the vehicle on which the map display device is mounted. The orientation data indicating the traveling orientation of the vehicle detected by the orientation sensor 14 is sent to the CPU 10.

Having received the speed data from the vehicle speed sensor 13 and the orientation data from the orientation sensor 14, the CPU 10 detects the current location of the vehicle by autonomous navigation based on these speed data and orientation data, and generates current location data. In such a way, the correct current location of the vehicle can always be obtained even if, for example, the GPS receiver 12 becomes unable to detect the current location of the vehicle in a tunnel or in between high buildings, because the autonomous navigation enables to detect the current location of the vehicle.

The touch panel 15 is placed on the screen of the liquid crystal monitor 22 and used for inputting various instructions to the map display device. The touch panel 15 generates signals corresponding to touched positions and sends the signals to the CPU 10 as operation data. In response to the operation data, the CPU 10 executes the processes for performing, for example, changing the display modes of the liquid crystal monitor 22, scrolling the screen, searching a facility, searching a route, guiding a route, or the like. Instead of or in combination with the touch panel 15, a remote controller (remocon), a hard switch, or a voice recognition device or the like may be used.

The radio receiver 16 receives radio broadcast signals, regenerates voice signals, and sends the resultant to the CPU 10. The CPU 10 sends the voice signals sent from the radio receiver 16 to the amplifier 23 as voice data. Thus, voices of radio broadcast are output from the speaker 24 as described later.

The HDD 17 stores specific region boundary data D1, a specific region dedicated database D2, a specific region permitted database D3, an outside-specific-region database D4, and the program D5. The specific region boundary data D1 is the data representing boundaries (for example, international borders) between a specific region and outside thereof. The specific region dedicated database D2 stores the map data permitted only inside the specific region by encrypting. Hereupon, the "specific region" refers to a country or a region in which the takeout of the map is prohibited.

The specific region permitted database D3 stores the data inside the specific region usable outside the specific region, for example, photographs taken from a satellite (hereinafter "satellite photo"). Hereupon, the wording "outside the specific region" refers to a country or a region in which the takeout of the map is not prohibited. The outside-specific-region database D4 stores the map data outside the specific region usable in both inside and outside the specific region. The program D5 is the data describing the procedure for operating the map display device, as mentioned above. Various data stored in the HDD 17 is read out by the CPU 10.

The CD/DVD drive 18 reproduces the information recorded on a loaded CD or DVD 18a. The sound signals and video signals obtained by the reproduction in the CD/DVD drive 18 are sent to the CPU 10. The CPU 10 sends the video signals sent from the CD/DVD drive 18 to the graphics chip 21, and the sound signals to the amplifier 23. In such a way, video images are displayed on the liquid crystal monitor 22 and voices are output from the speaker 24, as described later.

The encryption chip 19 encrypts or decrypts the data sent from the CPU 10 and returns the resultant to the CPU 10. The encryption chip 19 is used to encrypt the map data permitted only inside the specific region, and store the resultant in the specific region dedicated database D2 of the HDD 17, or to decrypt the encrypted map data read out from the specific region dedicated database D2 of the HDD 17.

The mobile phone 20 is used for controlling communication between the map display device and the external. Namely, the mobile phone 20 receives the radio waves transmitted from the external, converts them into electrical signals, and sends the same as received signals to the CPU 10, as well as converts the transmission signals sent from the CPU 10 into radio waves and transmits the same to the external. The mobile phone 20 is used, for example, for obtaining various information from external servers.

The graphics chip 21 corresponds to one part of the display unit of the invention, draws images based on the display data sent from the CPU 10 and sends the same as video signals to the liquid crystal monitor 22. The liquid crystal monitor 22 corresponds to other part of the display unit of the invention, and displays images based on the video signals sent from the graphics chip 21.

The amplifier 23 generates and amplifies voice signals based on the voice data sent from the CPU 10 to send the resultant to the speaker 24. The speaker 24 converts the amplified voice signals (electrical signals) sent from the amplifier 23 into voices (acoustic signals) to output the resultant.

In the map display device configured as described above, when the user operates the touch panel 15, navigation functions such as map display, current location display, route search, route guide, map scroll, and POI (Point of Interest) search are executed, and also the reproduction of a CD or a DVD 18a by the CD/DVD drive 18, the reception of a radio broadcast, and so on are executed. Also, various pieces of service information are obtained through communication with external servers using the mobile phone 20.

Figure 2:
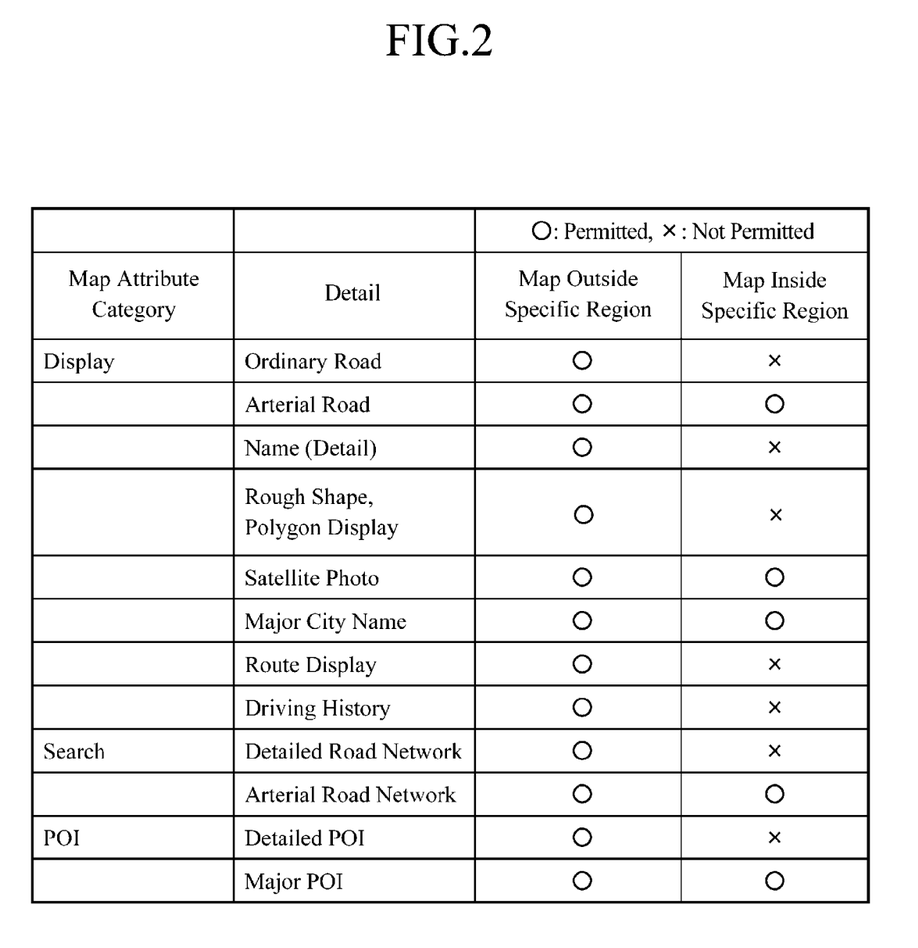
FIG. 2 is a diagram showing examples of map attributes used in the map display device of Embodiment 1 in the invention.

FIG. 2 is a diagram showing examples of map attributes outside and inside a specific region where the use from the outside of the specific region is permitted. In the case of the examples, the map attributes inside the specific region where the use from the outside of the specific region is permitted are Arterial Road, Satellite Photo, Major City Name, Arterial Road Network, and Major POI. The map attributes inside the specific region where the use from the outside of the specific region is permitted are in principle the map attributes available from the outside of the specific region.

Figure 3:
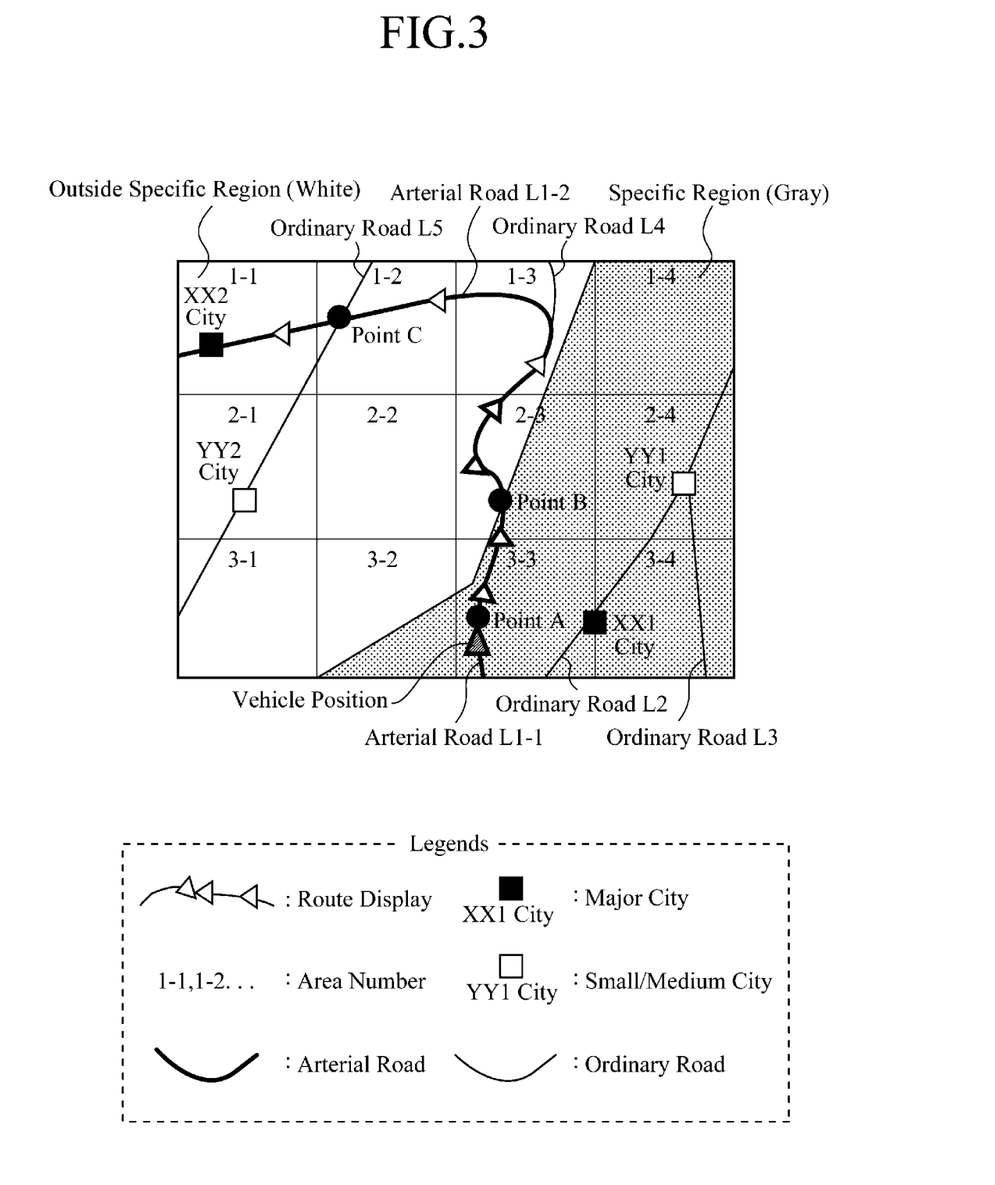
FIG. 3 is a diagram showing an example of a map display of the map display device of Embodiment 1 in the invention when a vehicle is inside a specific region.

FIG. 3 is a diagram showing an example of a map display, showing the case where the inside and the outside of the specific region are displayed in a different mode. The map is generally managed by a unit of a certain divided area (which is called tile, parcel, region, or the like). FIG. 3 shows an example in which a vehicle is inside the specific region, in which case all the map attributes are displayed. Also, FIG. 3 shows a case where the vehicle travels along a route from point A inside the specific region via point B on a boarder to point C outside the specific region.

Figure 4:
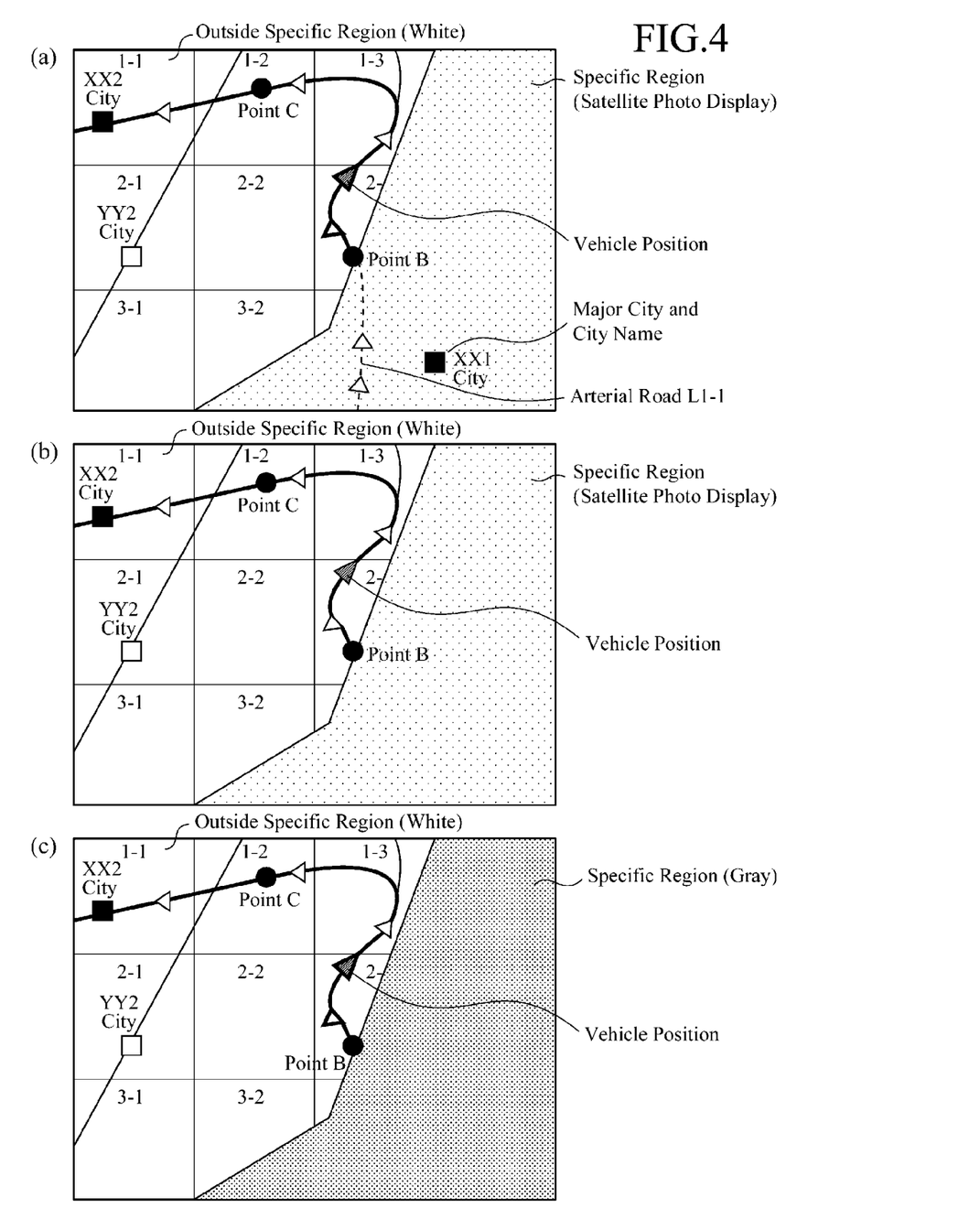
FIG. 4 is a diagram showing examples of a map display of the map display device of Embodiment 1 in the invention when the vehicle is outside a specific region in comparison with a conventional map display.

FIG. 4(a) is a diagram showing an example of a map display in the case where a vehicle goes out of the specific region. As the vehicle passes through the point B on the boarder, a satellite photo is displayed as an permitted map attribute inside the specific region with arterial roads, arterial road routes, and major cities being displayed with broken lines thereover. FIG. 4(b) is a diagram showing an example of a map display in the case where there are only satellite photos as a map attribute of which the display is permitted inside the specific region. Also, FIG. 4(c) is a diagram showing a conventional example of a map display in the case where the vehicle goes out of the specific region; when the vehicle passes through point B on the border, the inside of the specific region is displayed as a gray blank.

Figure 5:
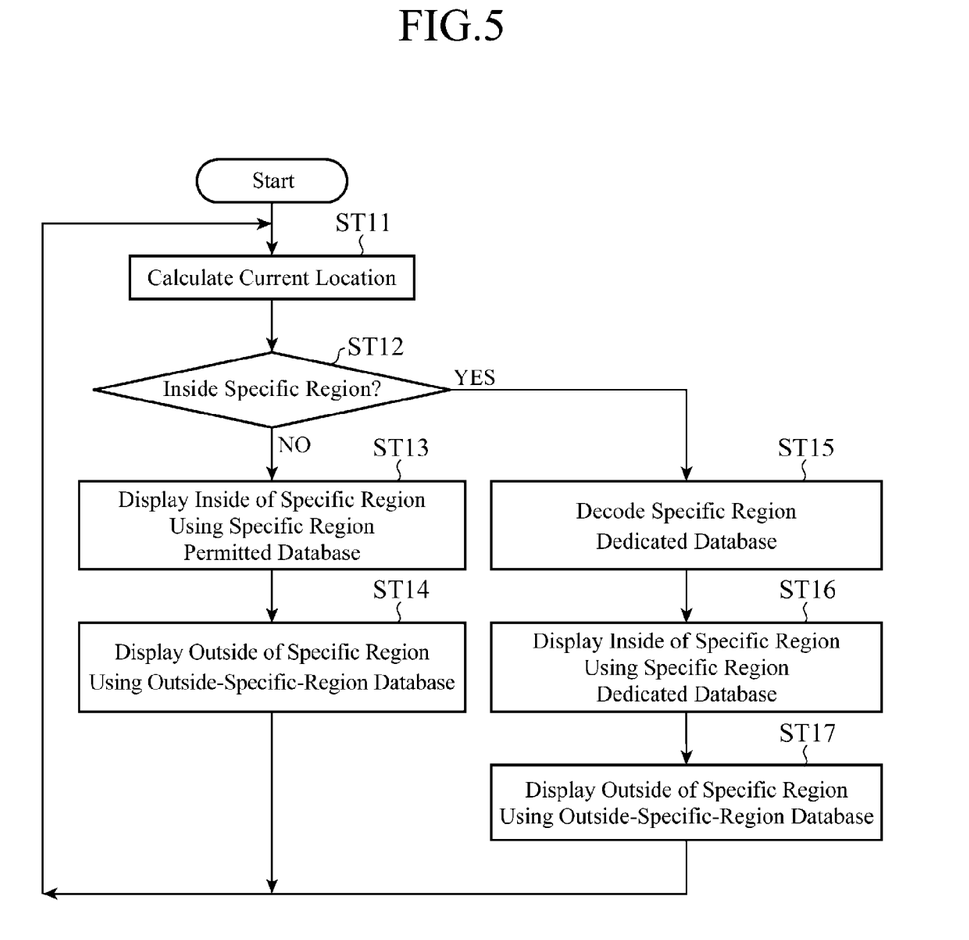
FIG. 5 is a flowchart showing an operation of the map display device of Embodiment 1 in the invention.
Figure 6:
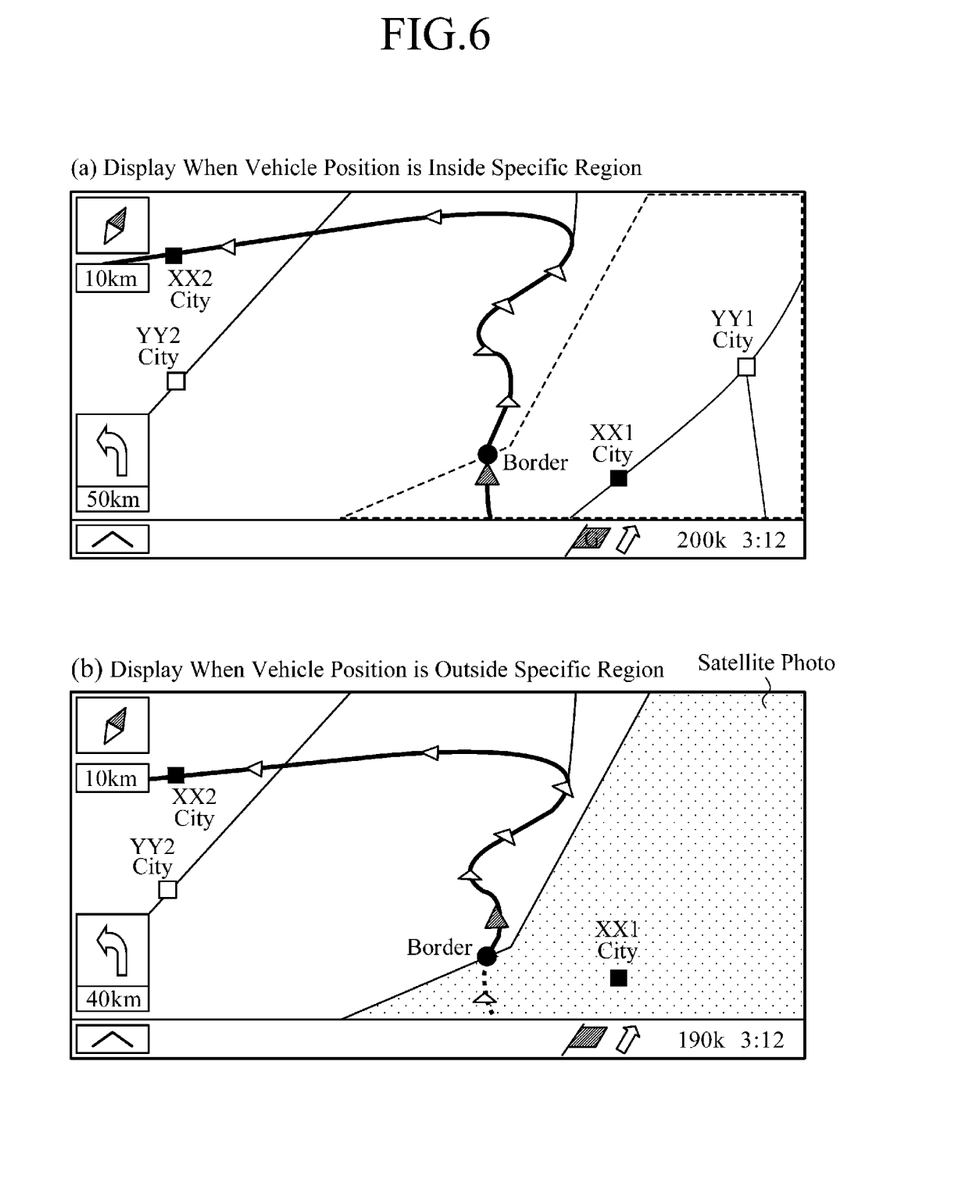
FIG. 6 is a diagram for explaining the operation of the map display device of Embodiment 1 in the invention.

Next, the operation of the map display device of Embodiment 1 in the invention, configured as described above, will be described with reference to the flowchart as shown in FIG. 5. It is assumed that in a condition that the vehicle position is inside the specific region, the calculation of a route from inside to outside the specific region is complete, and a map as shown in FIG. 6(a) is being displayed.

When the processing is started, the calculation of the current location is made (step ST11). Namely, the CPU 10 calculates the current location based on the current location data received from the GPS receiver 12, the speed data received from the vehicle speed sensor 13, and the orientation data received from the orientation sensor 14. The "current location calculating unit" in the invention is constituted by the function of calculating the current location of the CPU 10.

Then, whether the location is inside the specific region or not is determined (step ST12). Namely, the CPU 10 reads out the specific region boundary data D1 from the HDD 17 to determine whether or not the current location calculated at step ST11 is on the side of the specific region with respect to the boarder indicated by the read-out specific region boundary data D1.

When the location is determined not inside the specific region at the step ST12, the inside of the specific region is then displayed using the specific region permitted database D3 (step ST13). Namely, the CPU 10 reads out an image of the permitted map attributes, for example, data of a satellite photo, from the specific region permitted database D3 stored in the HDD 17 and sends the same as display data to the graphics chip 21.

Then, the outside of the specific region is displayed using the outside-specific-region database D4 (step ST14). Namely, the CPU 10 reads out map data from the outside-specific-region database D4 of the HDD 17 and sends the same as display data to the graphics chip 21. The graphics chip 21 draws an image of the satellite photo based on the display data sent from the CPU 10 at the above step ST13, as well as draws a map based on the display data sent from the CPU 10 at the step ST14, and sends the same as video signals to the liquid crystal monitor 22. The liquid crystal monitor 22 displays the image based on the video signals sent from the graphics chip 21. Thereafter, the sequence returns to step ST11 and the aforementioned processings are repeated.

Through the processings of these steps ST13 and ST14, as shown in FIG. 6(b), a map in which a satellite photo is fitted in the specific region is displayed; also the arterial road in the specific region is displayed with a broken line, although the route display (triangles) on the arterial road is intact, and the location and name (XX1 city) of the major city are displayed; and further, in order to prevent the display of the letter "border" positioned inside the specific region from being lost, the display of the letter is moved to the outside of the specific region or represented otherwise. However, the display of the outside of the specific region is not changed.

When the location is determined inside the specific region in the above step ST12, the specific region dedicated database D2 is then decoded (step ST15). Namely, the CPU 10 sends encrypted map data read in from the specific region dedicated database D2 of the HDD 17 to the encryption chip 19. The encryption chip 19 decrypts the encrypted map data sent from the CPU 10 and returns the resultant to the CPU 10.

Then, the display inside the specific region is executed using the specific region dedicated database D2 (step ST16). Namely, the CPU 10 receives the map data decrypted at step ST15 from the encryption chip 19 and sends the same as display data to the graphics chip 21.

Next, the display outside the specific region is executed using the outside-specific-region database D4 (step ST17). Namely, the CPU 10 reads out map data from the outside-specific-region database D4 stored in the HDD 17 and sends the same as display data to the graphics chip 21. The graphics chip 21 draws a map inside the specific region based on the display data sent from the CPU 10 at the above-described step ST16, as well as draws a map outside the specific region based on the display data sent from the CPU 10 at the step ST17, and sends the data as video signals to the liquid crystal monitor 22. The liquid crystal monitor 22 displays the image based on the video signals sent from the graphics chip 21. Through the process of these steps ST15 to ST17, a map both inside and outside the specific region is displayed as shown in FIG. 6(a). Thereafter, the sequence returns to step ST11 and the aforementioned proceedings are repeated.

Figure 7:
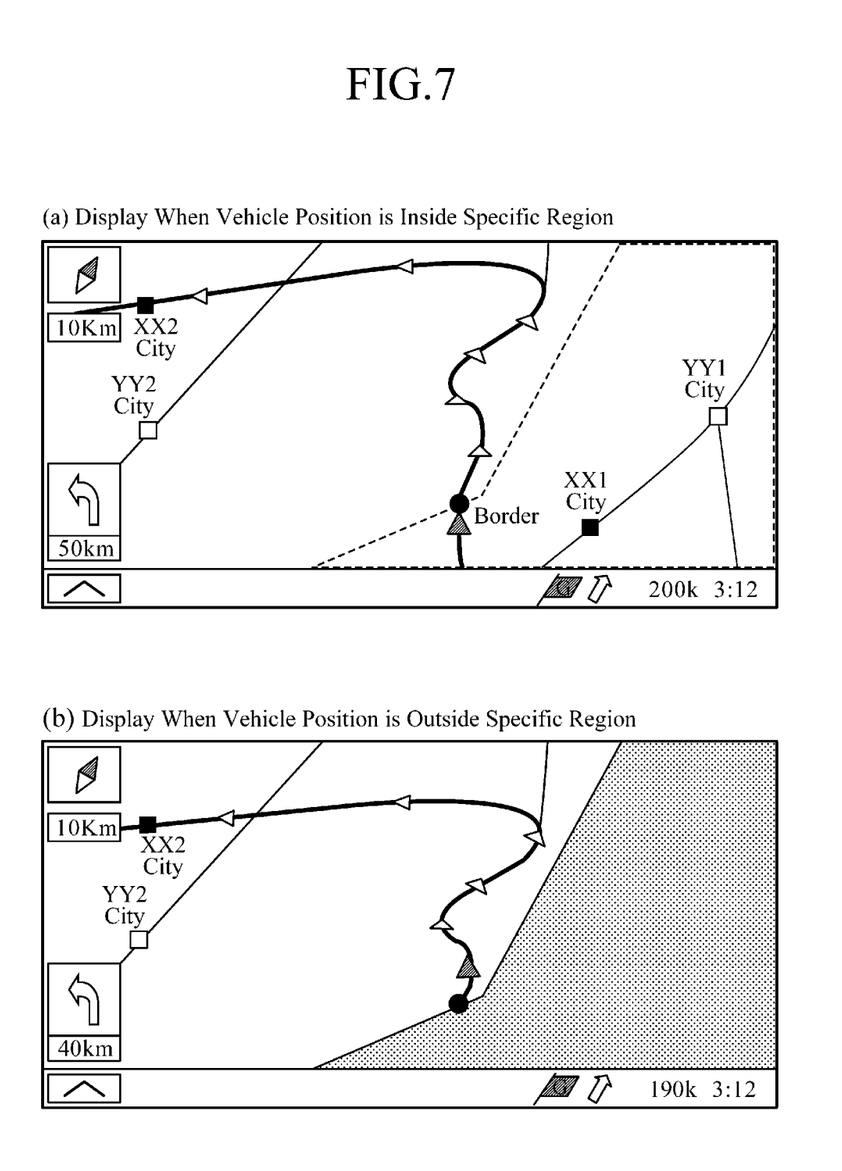
FIG. 7 is a diagram showing a map display of the map display device of Embodiment 1 in the invention in comparison with a conventional map display.

FIG. 7 is a diagram showing an example of a map display of a conventional map display device given for a comparison with the map display of the map display device of Embodiment 1; FIG. 7(a) is a display example in the case where a vehicle is inside the specific region, and FIG. 7(b) is a display example in the case where the vehicle is outside the specific region. In the conventional map display device, when the vehicle position is outside the specific region, as shown in FIG. 7(b), the specific region is painted out with gray at a time point when the vehicle goes out of the specific region, or at a time point when the map is scrolled from outside to inside the specific region. On the other hand, in the map display device of Embodiment 1, as shown in FIG. 6(b), the inside of the specific region is displayed with a satellite photo or the like instead of being painted out with gray. As a result, the specific region covered in a map that needs to be handled with care can be displayed without a feeling of incongruity.

In the map display device of Embodiment 1 as described above, it may be configured such that a vehicle position correction function included in common navigation systems, that is, a function for correcting the current location from outside to inside the specific region, is disabled.

Also, it may be configured such that point B on the border as shown in FIG. 3 (corresponding to the point on the border in the invention) is stored when the vehicle is moved from inside to outside the specific region, and in searching a return route, the CPU 10 searches a route to the point B on the border. The CPU 10 in this case corresponds to a route searching unit in the invention.

Furthermore, it may be configured such that an arterial road network is used when a route is searched from outside to inside the specific region, with a destination being connected from an arterial road with a phantom line. A route obtained by a route search from inside to outside the specific region is not displayed when the vehicle goes out of the specific region, and the driving track is deleted. However, when the display of routes is allowed, the route display remains, and so does the display of the driving track.

Embodiment 2

In a map display device of Embodiment 2 in the invention, it is configured that a specific region dedicated database D2 usable in a specific region is stored in a memory medium separate from that of a specific region boundary data D1, a specific region permitted database D3, an outside-specific-region database D4, and a program D5.

Figure 8:
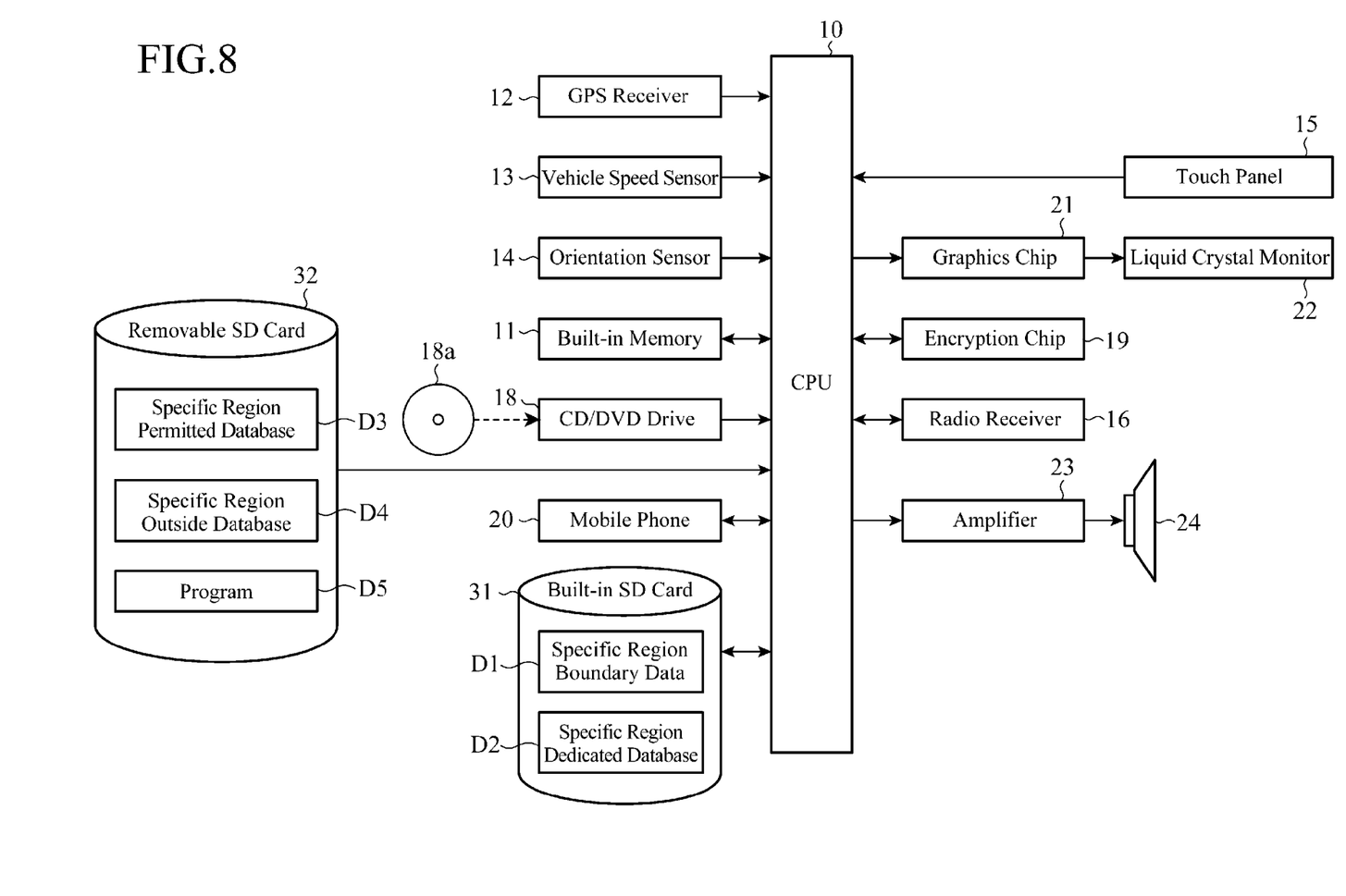
FIG. 8 is a block diagram showing a configuration of a map display device of Embodiment 2 in the invention.

FIG. 8 is a block diagram showing a configuration of the map display device of Embodiment 2 in the invention. The map display device is configured with a built-in SD card 31 and a removable SD card 32 provided instead of the HDD 17 of the map display device of Embodiment 1 as shown in FIG. 1. The built-in SD card 31 corresponds to the memory card in the invention.

The built-in SD card 31 is attached to a substrate on which components constituting the map display device are mounted, and provided with an unremovable structure. The structure is provided such that an attempt to forcibly remove the built-in SD card 31 will break it mechanically or electrically. The built-in SD card 31 stores the specific region boundary data D1 and the specific region dedicated database D2, and these data are read out by the CPU 10. The specific region boundary data D1 and the specific region dedicated database D2 stored in the built-in SD card 31 can be configured so as to be renewable with the use of a removable SD card, a write-only tool, communication equipment, or the like.

The removable SD card 32 stores the specific region permitted database D3, the outside-specific-region database D4, and the program D5. The data stored in the removable SD card 32 is read out by the CPU 10.

The operation of the map display device of Embodiment 2 is the same as that of the map display device of Embodiment 1 described above except that data is obtained from the built-in SD card 31 and the removable SD card 32 instead of being obtained from the HDD 17.

According to the map display device of Embodiment 2, an attempt to disassemble the map display device to unfairly decode the specific region dedicated database D2 can be prevented. Incidentally, it can be configured such that the roads inside the specific region are obtained from, for example, satellite photos, generally public maps, or the like to formulate a simplified database for the specific region, which can be used in a manner stored in the removable SD card 32.

Embodiment 3

In navigation systems, generally, when the reception of a GPS receiver 12 is disabled, a vehicle position is determined by a dead reckoning function; however, it is considered that the reception of the GPS receiver 12 is unfairly interrupted and pseudo vehicle speed data and orientation data are input so that the vehicle position is unfairly determined inside the specific region. To deal with such a situation, the map display device of Embodiment 3 in the invention reconfirms that the vehicle is inside the specific region.

The map display device of Embodiment 3 in the invention is configured the same as that of Embodiment 1 as shown in FIG. 1. In the map display device, in the event where the GPS receiver 12 is unable to correctly receive radio waves transmitted from a GPS satellite, the CPU 10 prohibits the use of the specific region dedicated database D2 inside the HDD 17.

However, it may be configured such that in the event where the GPS receiver 12 is unable to correctly receive radio waves transmitted from the GPS satellite, the use of the specific region dedicated database D2 is prohibited when a predetermined time required for passing through a tunnel or the like elapses, or when the vehicle travels a predetermined distance.

Also, it may be configured such that in the event where the GPS receiver 12 is unable to correctly receive the radio waves transmitted from the GPS satellite, the area in which the map can be displayed using the specific region dedicated database D2 is restricted to a certain range around the vehicle position, or the usable map attributes stored in the specific region dedicated database D2 are limited.

Also, it may be configured such that in the case where radio waves receivable only in the specific region (including analog and digital broadcast waves, or radio waves for communication used in the mobile phone 20) are received, the use of the specific region dedicated database D2 is permitted. Alternatively, it may be configured such that, in the case where radio waves not receivable in the specific region are received, the use of the specific region dedicated database D2 is prohibited.

Also, it may be configured such that the use of the specific region dedicated database D2 is permitted, when the current location is transmitted to a server (not shown) and a permission is given from the server. Further, through the use of the mobile phone 20 having a GPS function, it may be configured such that the use of the specific region dedicated database D2 is permitted, when the current location is transmitted to the server, the server checks the location of the mobile phone 20, and determines the location of the mobile phone 20 to be inside the specific region or not.

Furthermore, it may be configured such that when an illegal use of the specific region dedicated database D2 is detected, it is notified to a department managing the navigation system, and then the department makes the navigation system unusable.

Embodiment 4

Even outside a specific region, there are regions where no basic map data exists depending on how much a map database has been built. The map display device of Embodiment 4 in the invention deals with such a situation.

Figure 9:
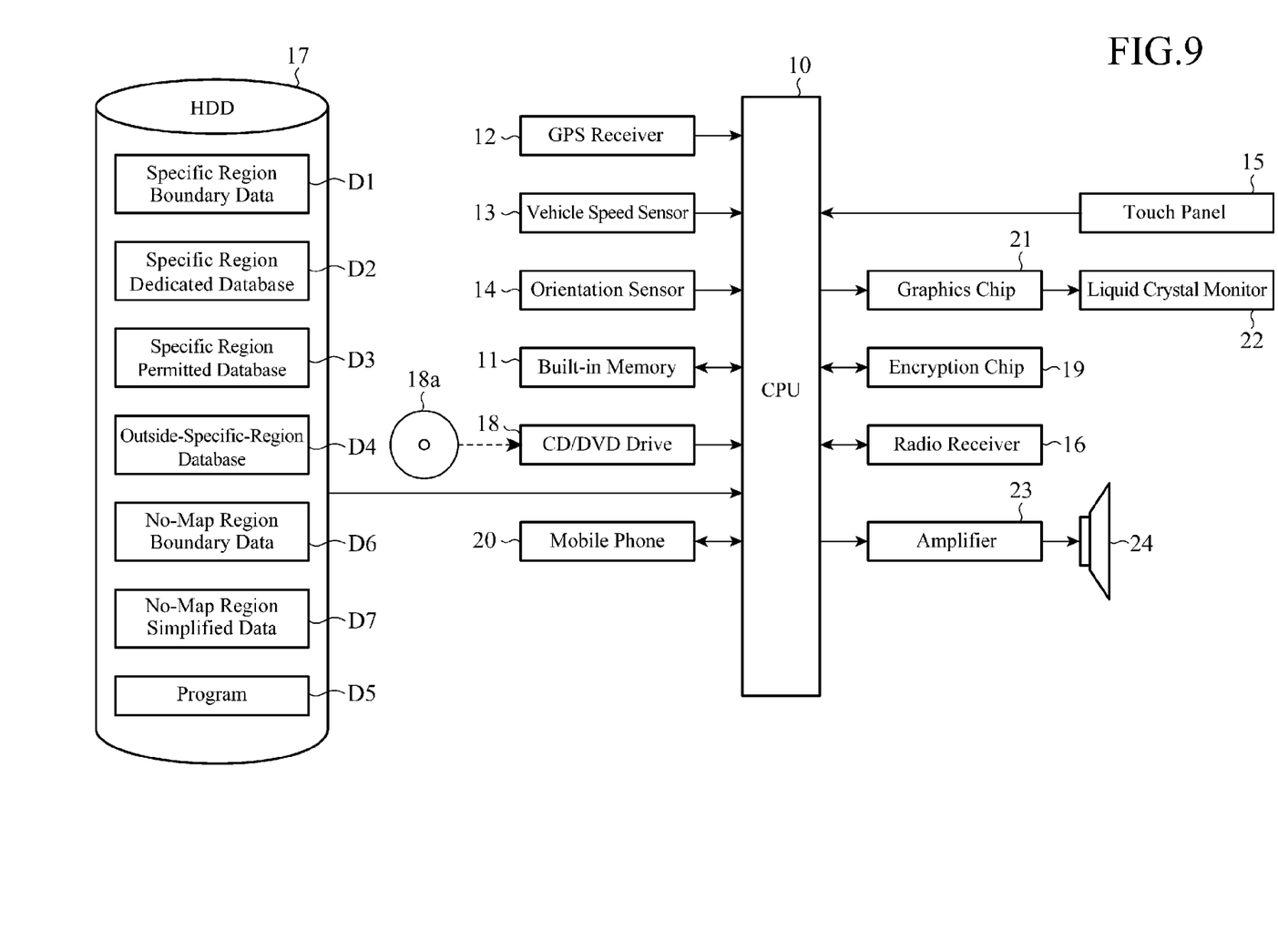
FIG. 9 is a block diagram showing a configuration of a map display device of Embodiment 4 in the invention.

FIG. 9 is a block diagram showing a configuration of a map display device of Embodiment 4 in the invention. The map display device of Embodiment 4 is configured the same as that of Embodiment 1 as shown in FIG. 1 except for the data stored in a HDD 17. Specifically, no-map region boundary data D6 and no-map region simplified data D7 is added to the HDD 17.

Figure 10:
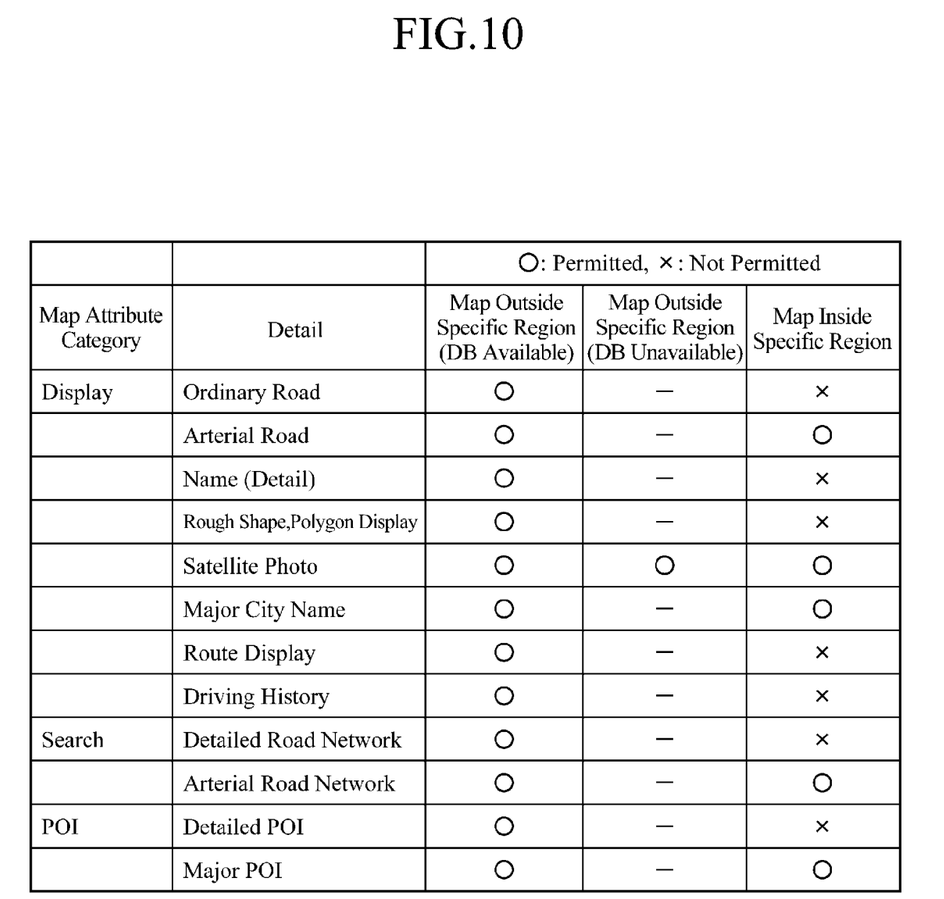
FIG. 10 is a diagram showing examples of map attributes used in the map display device of Embodiment 4 in the invention.

The no-map region boundary data D6 is the data indicating boundaries between a region where no basic map data exists and a region where the basic map data exists. Also, only satellite photos exist in the no-map region simplified data D7, as shown in the map attributes available in the case where a vehicle position in FIG. 10 is outside the specific region The operation of the map display device of Embodiment 4 configured as described above will be described. The operation of the map display device is different from that of the map display device of Embodiment 1 in the method of displaying the same map attributes of the specific region and outside thereof when the vehicle position is outside the specific region.

Figure 11:
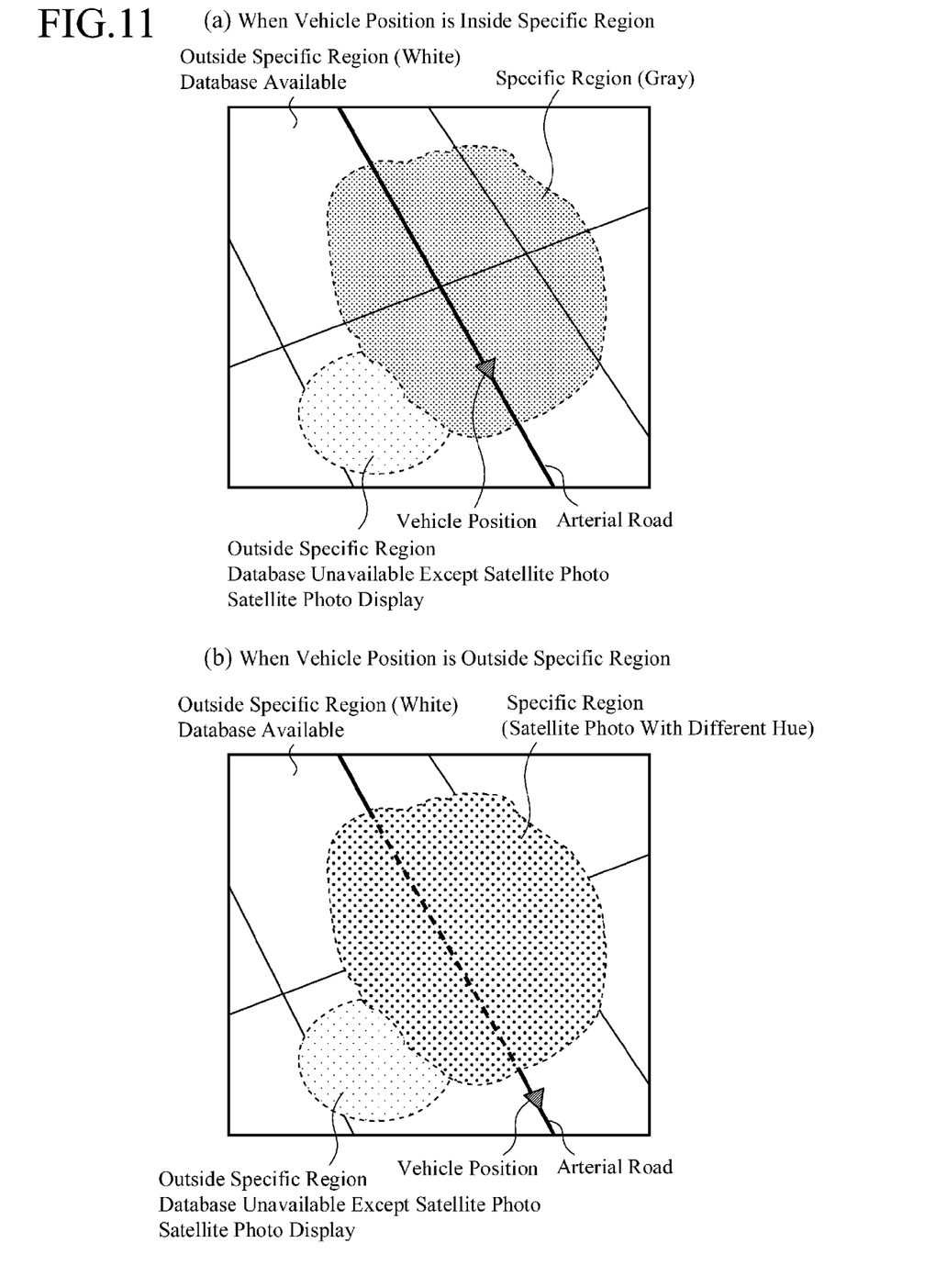
FIG. 11 is a diagram showing images of a map displayed in the map display device of Embodiment 4 in the invention.

FIG. 11 is a diagram showing images of a map display. When the vehicle position is inside the specific region, as shown in FIG. 11(*a*), the outside of the specific region where no basic map data exists is displayed by the satellite photo. When the vehicle position is outside the specific region, as shown in FIG. 11(*b*), the specific region is displayed in the satellite photo, with an arterial road displayed with a broken line. At this time, the satellite photo is displayed with a different hue so that the outside of the specific region having no map data and the specific region are distinguishable from each other. In this case, the device may be configured such that map data with different colors is stored in the HDD 17 beforehand, or, the hue is changed when the photo is displayed.

While the specific region has been explained as a "country" in the embodiments described above, the invention is also applicable to a case where the use of a map is restricted in a specific region of a state or a country. For example, if there is a map database opened only to the residents of a gated city, the map display devices of Embodiment 1 to Embodiment 4 can be applied with the gated city as the specific region.

INDUSTRIAL APPLICABILITY

The present invention is applicable to a navigation system traveling in a region where a map display of a map is restricted.

The invention claimed is:

1. A map display device comprising:
    a current position detector that calculates a current position;
    a controller that
        determines whether or not the current position is located in an inside of a specific region,
        generates, when the current position is located in the inside of the specific region, display data using a first map data representing the inside of the specific region and a second map data representing an outside of the specific region, use of the first map data being allowed during a stay at the inside of the specific region, and
        generates, when the current position is located in the outside of the specific region, display data using the second map data and a third map data, said third map data representing the inside of the specific region use of the third map data being allowed during a stay at the outside of the specific region; and
    a display unit that displays a map image based on the display data generated by the controller,
    wherein the first map data include a higher number of map attributes than the third map data for displaying the same region, and the use of the first map data and the use of the third map data for generating the display data are mutually exclusive.

2. The map display device according to claim 1, further comprising a route searching unit that searches a route from the current position to a destination,
    wherein, when the current position is located in the outside of the specific region and the destination is located in the inside of the specific region, the route searching unit searches the route by using an arterial road network contained in the third data and by connecting an arterial road to the destination with a phantom line.

3. The map display device according to claim 1, wherein the third map data includes data indicating major POIs.

4. The map display device according to claim 1, wherein the third map data includes data of an image obtainable outside the specific region.

5. The map display device according to claim 1, wherein the first map data is stored in a built-in memory card, such that an attempt to remove the memory card leads to mechanical or electrical breakage of the first map data.

6. The map display device according to claim 2, wherein when the current position moves from the inside to the outside of the specific region, a boundary point between the inside of the specific region where the current position has passed and the outside of the specific region is stored, and
    when searching a route from the outside to the inside of the specific region, the route searching unit searches a route from the outside of the specific region to the boundary point.

7. The map display device according to claim 1, wherein the controller changes a display position or representation of information which has been displayed within the inside of the specific region during a stay at the inside of the specific region when the current position moves from the inside to the outside of the specific region.

8. The map display device according to claim 1, wherein the controller displays by different display form a region for which no map data exists and a region for which map use is prohibited.

9. The map display device according to claim 1, wherein the first map data are stored in a memory medium separate from a memory medium in which the second map data and the third map data are stored.

10. The map display device according to claim 1, wherein the controller disables a vehicle position correction function for correcting the current position from outside to inside the specific region.

11. The map display device according to claim 1, wherein the current position detector detects the current position on a basis of a signal of Global Positioning System (GPS).

12. The map display device according to claim 11, wherein, when radio wave of the GPS signal is not received correctly, the controller prohibits use of the first map data.

13. The map display device according to claim 11, wherein, when radio wave of the GPS signal is not received correctly, the controller generates the display data by using the first map data for only a given area from the current position.

14. The map display device according to claim 11, wherein, when radio wave of the GPS signal is not received correctly, the controller limits usable map attributes among map attributes included in the first map data.

15. The map display device according to claim 1, wherein the current position detector detects the current position on a basis of radio wave.

16. The map display device according to claim 1, further comprising a decrypting processor that decrypts the first map data having been encrypted, wherein the controller uses the decrypted first map data.

17. The map display device according to claim 1, wherein the third map data include image data being allowed to obtain during a stay at the outside of the specific region.

18. A map display method comprising:

utilizing a position detector to calculate a current position;

utilizing a controller to execute a process including:

determining whether or not the current position is located in an inside of a specific region, generating, when the current position is located in the inside of the specific region, display data using a first map data representing the inside of the specific region and a second map data representing an outside of the specific region, the first map data being allowed to use during a stay at the inside of the specific region, and generating, when the current position is located in the outside of the specific region, display data using the second map data and a third map data, said third map data representing the inside of the specific region, the third map data being allowed to use during a stay at the outside of the specific region; and displaying a map image based on the display data generated by the controller, wherein the first map data include a higher number of map attributes than the third map data for displaying the same region, and the use of the first map data and the use of the third map data for generating the display data are mutually exclusive.

\* \* \* \* \*